United States Patent [19]

Fink et al.

[11] Patent Number: 4,473,678

[45] Date of Patent: Sep. 25, 1984

[54] AQUEOUS DISPERSION OF A SELF-CROSSLINKING RESIN

[75] Inventors: Herbert Fink, Bickenbach; Norbert Suetterlin; Klaus Huebner, both of Ober-Ramstadt; Werner Siol, Darmstadt, all of Fed. Rep. of Germany

[73] Assignee: Röhm GmbH, Darmstadt, Fed. Rep. of Germany

[21] Appl. No.: 441,602

[22] Filed: Nov. 15, 1982

[30] Foreign Application Priority Data

Nov. 27, 1981 [DE] Fed. Rep. of Germany ....... 3147007

[51] Int. Cl.³ .............................................. C08K 5/21
[52] U.S. Cl. ................................................... 524/211
[58] Field of Search ......................................... 524/211

[56] References Cited

FOREIGN PATENT DOCUMENTS

| | | |
|---|---|---|
| 6486 | 1/1980 | European Pat. Off. . |
| 956890 | 1/1957 | Fed. Rep. of Germany . |
| 1102410 | 11/1972 | Fed. Rep. of Germany . |

OTHER PUBLICATIONS

Perry et al., Textile Chemist and Colorist, 12, 311–316, (1980).

*Primary Examiner*—Paul R. Michl
*Assistant Examiner*—Alex H. Walker
*Attorney, Agent, or Firm*—Curtis, Morris & Safford

[57] ABSTRACT

What are disclosed are aqueous dispersions of a self-crosslinking synthetic resin, said dispersions consisting of an aqueous phase containing from 0.2 to 5 weight percent of urea and, dispersed therein, resin particles formed of a vinyl polymer comprising (a) from 52.1 to 97.9 weight percent of acrylate or methacrylate esters, vinyl esters, or styrene; (b) from 0.1 to 10 weight percent of N-methylol acrylamide or methacrylamide; (c) from 2 to 10 weight percent of an hydroxyalkyl ester of an unsaturated carboxylic acid; and (d) 0 to 27.9 weight percent of other monomers, which dispersions, on drying and condensation to form films, liberate much less formaldehyde than comparable dispersions without urea while retaining good solvent resistance.

2 Claims, No Drawings

AQUEOUS DISPERSION OF A SELF-CROSSLINKING RESIN

The present invention relates to aqueous dispersions of a synthetic resin which are self-crosslinking because the dispersed resin contains N-methylolamide groups.

Aqueous synthetic resin dispersions comprising vinyl polymers containing N-methylolamide groups (such groups liberate formaldehyde, which is regarded as a nuisance or a health hazard) have been known for decades in countless varieties. They include those according to German Pat. No. 1,102,410 in which hydroxyalkyl esters of acrylic or methacrylic acid are incorporated as additional groups during polymerization. Upon condensation, the dispersions form films having increased solvent resistance. However, this effect is so slight that in practice the addition of an hydroxy-alkyl ester is usually dispensed with, unless it is advantageous for other reasons.

It is generally known to add formaldehyde acceptors which chemically bind formaldehyde to bonding agents which may cleave formaldehyde, or to add such acceptors to the substrate bonded by the bonding agents. Cf. European patent 6486, wherein urea is used as a formaldehyde acceptor. However, urea is not the most effective of the known formaldehyde acceptors. Cf. R. S. Perry et al., Textile Chemist and Colorist, 12, 311–316 (1980). Heterocyclic compounds such as benzotriazole are regarded as much more effective.

The object of the present invention is to provide a self-crosslinking aqueous plastic dispersion which contains N-methylolamide groups, but which, either as such or upon drying to a film or upon condensation of the film, liberates less formaldehyde without adversely affecting the properties of the condensed film for various technical uses.

As is to be expected, a drastic reduction of formaldehyde liberation can be obtained by the addition of urea. However, this will considerably lower the resistance of the condensed film to trichloroethylene. This is apparent from a woven fabric impregnated with 50 weight percent of resin. A conventional dispersion for textile impregnation composed of 95 weight percent butyl acrylate and 5 weight percent N-methylol methacrylamide was used.

|  | Formaldehyde liberation | | Loss of bonding agent in dry-cleaning with trichloroethylene (%) |
|---|---|---|---|
|  | On drying (ppm) | Up to complete condensation (ppm) |  |
| Urea-free dispersion | 830 | 1910 | 6.5 |
| Same dispersion with 2% urea | less than 50 | 170 | 14 |

The object of the invention is accomplished by a resin containing from 2 to 10 percent by weight of an hydroxyalkyl ester and wherein urea is present in the aqueous phase. Surprisingly, the addition of urea will not have an adverse effect on the solvent resistance if the dispersion contains units of a hydroxyalkyl ester. The effect obtained in accordance with the invention could not possibly have been derived from the teachings of German Pat. No. 1,102,410, according to which hydroxy ester groups improve solvent resistance, as said effect would then be evident also in urea-free dispersions. There, however, rather the opposite effect is observed, as is apparent from the following continuation of the above table:

|  | Formaldehyde liberation | | Loss of bonding agent in dry-cleaning with trichloroethylene (%) |
|---|---|---|---|
|  | On drying (ppm) | Up to complete condensation (ppm) |  |
| Urea-free dispersion with 5 wt. % hydroxyethyl methacrylate units | 630 | 1300 | 7.5 |
| Same dispersion with 2% urea | 50 | 120 | 7.3 |

The effect in accordance with the invention, namely that formaldehyde liberation is considerably suppressed while the solvent resistance required by the end uses is fully retained, thus is unexpected and must be due to an interaction, unknown up to now and still not understood, between the formaldehyde being liberated, the urea groups, and the hydroxyl groups. Surprisingly, comparable effects cannot be obtained with other known formaldehyde acceptors, such as melamine. This supports the hypothesis that a specific interaction is involved here.

The dispersions in accordance with the invention are suited for use in all fields where self-crosslinking resin dispersions with N-methylol groups are used. The reduced liberation of formaldehyde comes into play only when no other major sources of formaldehyde, for example, substantial amounts of amino resins or phenolic resins, are concurrently present. Typical uses are for the impregnation of fabrics, paper and cardboard, and of wadding and nonwoven fabrics, the coating of substrates of all kinds wherein the dispersion generally is used as a binder for fillers and dyes, and the manufacture of compression molding compounds and sealing and caulking compounds.

As the principal monomer component, comprising up to 97.9 percent of all the monomers employed, alkyl acrylates and alkyl methacrylates, particularly those of $C_1$-$C_6$ alkanols, are preferred. Vinyl esters, particularly vinyl acetate and vinyl propionate, can also be used, alone, in combination with each other, or in all proportions with the acrylates and methacrylates. Similarly, the principal monomer component may be, or comprise, styrene and/or substituted styrene such as vinyl toluene and alpha-methyl styrene. Since styrene alone gives very hard polymers which would require plasticization for film formation, styrene is generally present in admixture with other monomers, particularly the acrylates and methacrylates. The substituted styrenes are employed in amounts not exceeding 30 percent by weight of the total copolymer.

N-methylol acrylamide and/or methacrylamide are preferably used in amounts of from 1 to 6 percent, optionally together with approximately equal amounts of the corresponding free amides, in forming the vinyl polymer.

Suitable hydroxyalkyl esters are esters of $\alpha,\beta$-ethylenically monounsaturated mono- and di-carboxylic acids having 3 to 5 carbon atoms, e.g. in addition to the esters and semiesters of maleic, fumaric, and itaconic acid, primarily the esters of acrylic and methacrylic acid. The esters are preferably formed from linear and branched alkylene glycols having from 2 to 12 carbon atoms, preferably from 2 to 6 carbon atoms, and from such glycols wherein the alkylene chain may be interrupted by up to 6 oxygen atoms, preferably up to 3 oxygen atoms. Linear $C_2$–$C_4$ alkylene glycols are particularly preferred. Thus, the esters may be derived from ethylene glycol, 1,2-propylene glycol, 1,2-butylene glycol, 1,4-butanediol, diglycol, triethylene glycol, or other polyglycols. Amounts of less than 2 percent will not permit the full advantageous effect to be obtained, whereas with amounts ranging from about 4 to 6 weight percent the effect is usually maximum. While amounts greater than 10 percent are effective, they may render the polymer too hydrophilic for many uses.

All other vinyl monomers not included above but copolymerizable with the monomers mentioned may, if desired, enter into the formation of the vinyl polymer in amounts totaling not more than 27.9 weight percent. These include unsaturated polymerizable carboxylic acids such as acrylic and methacrylic acid and their nitriles, vinyl halides, vinylidene chloride, vinyl ether, and up to 3 percent by weight of crosslinking monomers having two or more polymerizable vinyl groups, such as divinylbenzene, allyl acrylate and methacrylate, glycol diacrylate and dimethacrylate, methylene-bis-acrylamide and -methacrylamide, and triallyl cyanurate.

It has proved advantageous to add the urea to the finished dispersion only after completion of polymerization and then to dissolve it in the aqueous phase. The amount to be added will be the larger the more N-methylolamide groups are contained in the vinyl polymer. Amounts ranging from 1 to 3 weight percent usually result in adequate reduction of formaldehyde liberation. As a rule of thumb, the amount of urea used should be about one-half the amount of the methylolamide. If too much urea is added, the solvent resistance of the condensed polymer is reduced. The amount of urea added is based on the total weight of the dispersion.

A better understanding of the present invention will be had by referring to the following specific examples, given by way of illustration.

EXAMPLES 1 TO 4

160 parts of water and 0.48 part of a 12.5% aqueous solution of a sulfated and neutralized reaction product of tri-sec-butylphenol with 7 moles of ethylene oxide (as emulsifier) were heated to 80° C. with stirring in a 1-liter flask equipped with a stirrer and then mixed with 1 part of a 10% ammonium persulfate solution. To this there was added dropwise, as an emulsion, over a period of 4 hours, at said temperature, 230 parts of water, 16 parts of the emulsifier solution described above, 9 parts of a 10% ammonium persulfate solution, and 400 parts of a monomer mixture according to the Table which follows. The temperature was maintained at 80° C. for 2 hours, following which the mixture was cooled to room temperature. The finished dispersion was divided into two portions, one of these being mixed with urea and both being adjusted to a pH of 2.2. The dispersions were free of coagulate and stable.

EXAMPLE 5

160 parts of water, 0.8 part of acetic acid, 2 parts of borax, and 3.2 parts of the emulsifier solution described in Example 1 were heated to 80° C. in a 1-liter flask equipped with a stirrer, with stirring, and then mixed with 10 parts of a 10% ammonium persulfate solution. To this there was added dropwise, as an emulsion, over a period of 4 hours, at said temperature, 227 parts of water, 16 parts of the emulsifier solution described above, 9 parts of a 10% ammonium persulfate solution, and 400 parts of a monomer mixture according to the Table which follows. The temperature was maintained at 80° C. for 2 hours, following which the mixture was cooled to room temperature. The finished dispersion was divided into two portions, one of these being mixed with urea and both being adjusted to a pH of 2.2 with phosphoric acid.

Methods of analysis

The *free formaldehyde* in the dispersion was analyzed by mixing the dispersion, diluted with from 6 to 8 times as much water, with a hydroxyammonium chloride solution of pH 2.9 and after 20 minutes titrating the liberated hydrochloric acid. 1 mole of liberated hydrochloric acid corresponds to 1 mole of formaldehyde. (Specified in percent based on the weight of the dispersion.)

The *total formaldehyde liberation* was determined by heating a sample of the dispersion to 140° C. The amount of gaseous formaldehyde liberated within 15 minutes was determined. (Specified in percent based on the weight of the dispersion.)

The *binder loss* on treatment with trichloroethylene (BLT) was determined using a polyester fabric impregnated with the dispersion and dried at 80° C., which fabric had a binder content of from 40 to 50% of the weight of the fibers. For purpose of the test, the fabric sample was treated for 20 minutes at 20° C. in a laboratory washing machine, rinsed with trichloroethylene, and dried at 80° C. The weight loss, in percent based on the binder content, was then determined.

The swelling due to *methyl isobutyl ketone* (MIBK) was determined using a film of a thickness of 0.5 mm produced from a sample of the dispersion being tested by drying at 80° C. and condensing at 140° C. The film was allowed to swell in MIBK at 20° C. for 30 minutes and 4 hours, respectively, following which it was blotted and the percent increase in weight was determined.

| Polymer composition | | Urea (%) | Free formaldehyde (%) | Total formaldehyde liberation (%) | BLT (%) | MIBK absorption 0.5 hr. (%) | 4 hr. (%) |
|---|---|---|---|---|---|---|---|
| Example 1 | | | | | | | |
| 200 parts | methyl methacrylate | | | | | | |
| 144 parts | butyl acrylate | 0 | 0.036 | 0.154 | 5 | 20 | |
| 16 parts | N—methylol methacrylamide solution | | | | | | |
| 20 parts | 2-hydroxyethyl acrylate | | | | | | |
| 12 parts | methacrylamide | 3 | 0.007 | 0.009 | 5 | 20 | |

-continued

| | Polymer composition | Urea (%) | Free formaldehyde (%) | Total formaldehyde liberation (%) | BLT (%) | MIBK absorption 0.5 hr. (%) | MIBK absorption 4 hr. (%) |
|---|---|---|---|---|---|---|---|
| Comparative example without hydroxy ester | 4 parts methacrylic acid<br>4 parts glycol dimethacrylate<br>200 parts methyl methacrylate<br>164 parts butyl acrylate<br>16 parts N—methylol methacrylamide solution<br>12 parts methacrylamide<br>4 parts methacrylic acid<br>4 parts glycol dimethacrylate | 0<br><br><br><br><br><br>3 | 0.052<br><br><br><br><br><br>0 | 0.197<br><br><br><br><br><br>0.007 | 7<br><br><br><br><br><br>10 | 30<br><br><br><br><br><br>60 | |
| Example 2 | | | | | | | |
| | 200 parts ethyl acrylate<br>132 parts methyl methacrylate<br>40 parts 2-hydroxyethyl acrylate<br>24 parts N—methylol methacrylamide solution<br>4 parts itaconic acid | 0<br><br><br>2 | 0.095<br><br><br>0.026 | 0.174<br><br><br>0.014 | 1<br><br><br>4 | 18<br><br><br>30 | 70<br><br><br>85 |
| Comparative example without hydroxy ester | 200 parts ethyl acrylate<br>172 parts methyl methacrylate<br>24 parts N—methylol methacrylamide solution<br>4 parts itaconic acid | 0<br><br><br>2 | 0.088<br><br><br>0.011 | 0.209<br><br><br>0.009 | 4<br><br><br>10 | 10<br><br><br>40 | 80<br><br><br>125 |
| Example 3 | | | | | | | |
| | 240 parts butyl acrylate<br>102 parts styrene<br>40 parts 4-hydroxybutyl acrylate<br>16 parts N—methylol methacrylamide solution<br>2 parts allyl methacrylate | 0<br><br><br>5 | 0.042<br><br><br>0 | 0.123<br><br><br>0.005 | 1<br><br><br>2 | 70<br><br><br>105 | 80<br><br><br>110 |
| Comparative example without hydroxy ester | 240 parts butyl acrylate<br>142 parts styrene<br>16 parts N—methylol methacrylamide solution<br>2 parts allyl methacrylate | 0<br><br>5 | 0.055<br><br>0.008 | 0.173<br><br>0.005 | 1<br><br>4 | 120<br><br>180 | 150<br><br>210 |
| Example 4 | | | | | | | |
| | 390 parts ethyl acrylate<br>8 parts 4-hydroxybutyl acrylate<br>2 parts N—methylol methacrylamide solution | 0<br><br>0.2 | 0<br><br>0 | 0.034<br><br>0.011 | 10<br><br>15 | 380<br><br>410 | 480<br><br>decomp. |
| Comparative example without hydroxy ester | 398 parts ethyl acrylate<br>2 parts N—methylol methacrylamide solution | 0<br>0.2 | 0<br>0.010 | 0.059<br>0.010 | 20<br>50 | 390<br>600 | decomp.<br>decomp. |
| Example 5 | | | | | | | |
| | 360 parts vinyl acetate<br>20 parts 2-hydroxyethyl acrylate<br>20 parts N—methylol acrylamide solution | 0<br><br>2 | 0.127<br><br>0.080 | *<br><br>* | 8<br><br>9 | 10<br><br>17 | 60<br><br>90 |
| Comparative example without hydroxy ester | 380 parts vinyl acetate<br>20 parts N—methylol acrylamide solution | 0<br>2 | 0.124<br>0.066 | *<br>* | 9<br>15 | 20<br>40 | 90<br>140 |

* Not determined since adulterated by acetaldehyde.

What is claimed is:

1. An aqueous dispersion of a self-crosslinking synthetic resin, said dispersion consisting of an aqueous phase containing from 0.2 to 5 weight percent of urea, based on the total weight of the dispersion, and, dispersed therein, resin particles formed of a vinyl polymer comprising
   (a) from 52.1 to 97.9 weight percent of at least one unsaturated polymerizable monomer selected from the group consisting of acrylate and methacrylate alkyl esters, vinyl esters, and styrene;
   (b) from 0.1 to 10 weight percent of N-methylol acrylamide, N-methylol methacrylamide, or both;
   (c) from 2 to 10 weight percent of an hydroxyalkyl ester of an α,β-unsaturated mono- or di-carboxylic acid; and
   (d) from 0 to 27.9 weight percent of one or more comonomers which are different from, but copolymerizable with, monomers (a)-(c).

2. An aqueous dispersion as in claim 1 wherein said vinyl polymer comprises from 70 to 97.9 weight percent of the monomer component (a).

* * * * *